United States Patent
Liu et al.

(10) Patent No.: US 10,447,393 B2
(45) Date of Patent: Oct. 15, 2019

(54) VEHICLE-MOUNTED VISIBLE LIGHT EMISSION SYSTEMS AND RECEPTION SYSTEMS, AND COMMUNICATION NETWORKS

(71) Applicant: BOE Technology Group Co., Ltd., Beijing (CN)

(72) Inventors: Kairan Liu, Beijing (CN); Xinguo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/679,971

(22) Filed: Aug. 17, 2017

(65) Prior Publication Data

US 2018/0198523 A1    Jul. 12, 2018

(30) Foreign Application Priority Data

Jan. 6, 2017   (CN) .......................... 2017 1 0009018

(51) Int. Cl.
*H04B 10/60* (2013.01)
*H04W 4/40* (2018.01)
(Continued)

(52) U.S. Cl.
CPC ......... *H04B 10/116* (2013.01); *H04B 10/502* (2013.01); *H04B 10/60* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,520,695 B1 * | 8/2013 | Rubin | G08G 9/02 370/445 |
| 2007/0109111 A1 * | 5/2007 | Breed | B60N 2/2863 340/435 |

(Continued)

FOREIGN PATENT DOCUMENTS

| | | |
|---|---|---|
| CN | 102436737 A | 5/2012 |
| CN | 202863291 U | 4/2013 |

(Continued)

OTHER PUBLICATIONS

First Office Action, including Search Report, for Chinese Patent Application No. 201710009018.1, dated Aug. 23, 2018, 17 pages.

(Continued)

*Primary Examiner* — Omar S Ismail
(74) *Attorney, Agent, or Firm* — Westman, Champlin & Koehler, P.A.

(57) ABSTRACT

The present disclosure provides a vehicle-mounted visible light emission system and reception system and a communication network. The vehicle-mounted visible light emission system comprises: a vehicle information acquisition unit configured to acquire vehicle information to be transmitted; a processing unit configured to process the vehicle information acquired by the vehicle information acquisition unit; and a visible light emission unit configured to transmit a visible light signal in a manner of switching between dimming and brightening over time based on the processed vehicle information.

14 Claims, 3 Drawing Sheets

(51) Int. Cl.
*H04B 10/116* (2013.01)
*H04L 9/08* (2006.01)
*H04B 10/50* (2013.01)
*H04L 29/08* (2006.01)

(52) U.S. Cl.
CPC ............. *H04L 9/0852* (2013.01); *H04W 4/40* (2018.02); *H04L 67/12* (2013.01)

(56) References Cited

U.S. PATENT DOCUMENTS

| | | | | |
|---|---|---|---|---|
| 2007/0242337 | A1* | 10/2007 | Bradley | B60Q 1/0017 359/237 |
| 2011/0305030 | A1* | 12/2011 | Dubosc | B60Q 1/46 362/464 |
| 2012/0050074 | A1* | 3/2012 | Bechtel | B60R 1/04 340/988 |
| 2014/0099107 | A1* | 4/2014 | Ravich | H04B 10/116 398/43 |
| 2015/0228195 | A1* | 8/2015 | Beaurepaire | G08G 1/0962 340/907 |
| 2016/0065367 | A1* | 3/2016 | Oshida | H04L 9/0869 370/329 |
| 2017/0187963 | A1* | 6/2017 | Lee | G06F 3/013 |
| 2017/0197544 | A1 | 7/2017 | Wang et al. | |
| 2018/0098215 | A1* | 4/2018 | Roberts | H04W 12/06 |

FOREIGN PATENT DOCUMENTS

| | | |
|---|---|---|
| CN | 104882001 A | 9/2015 |
| CN | 105667387 A | 6/2016 |
| CN | 105741535 A | 7/2016 |
| CN | 105959022 A | 9/2016 |

OTHER PUBLICATIONS

Second Office Action, including Search Report, for Chinese Patent Application No. 201710009018.1, dated Feb. 22, 2019, 16 pages.

* cited by examiner

VEHICLE-MOUNTED VISIBLE LIGHT EMISSION SYSTEMS AND RECEPTION SYSTEMS, AND COMMUNICATION NETWORKS

CROSS-REFERENCE TO RELATED APPLICATION(S)

This application claims priority to the Chinese Patent Application No. 201710009018.1, filed on Jan. 6, 2017, entitled "VEHICLE-MOUNTED VISIBLE LIGHT EMISSION SYSTEMS AND RECEPTION SYSTEMS, AND COMMUNICATION NETWORKS," which is incorporated herein by reference in its entirety.

TECHNICAL FIELD

The present disclosure relates to the field of vehicle communications, and more particularly, to vehicle-mounted visible light emission systems and reception systems and communication networks.

BACKGROUND

During driving, a driver may need to understand road conditions outside a visual field of his/her vehicle for a variety of reasons. Therefore, visual field information of the vehicle ahead shall be obtained timely and accurately to improve driving safety.

SUMMARY

The present disclosure proposes a vehicle-mounted visible light emission system, a reception system and a communication network.

According to an aspect of the present disclosure, there is proposed a vehicle-mounted visible light emission system. The vehicle-mounted visible light emission system comprises: a vehicle information acquisition unit configured to acquire vehicle information to be transmitted; a processing unit configured to process the vehicle information acquired by the vehicle information acquisition unit; and a visible light emission unit configured to transmit a visible light signal in a manner of switching between dimming and brightening over time based on the processed vehicle information.

In an embodiment, the vehicle information is image information collected by a vehicle-mounted camera or vehicle operation information collected from a vehicle electronic system.

In an embodiment, processing the vehicle information comprises at least one of: modulation, compression, encryption, and encoding.

In an embodiment, the processed vehicle information is in a form of binary code stream, and the visible light emission unit is configured to: enter a "light emission-enabled" state for "1" in the code stream; and enter a "light emission-disabled" state for "0" in the code stream.

In an embodiment, the processing unit is further configured to transmit the vehicle information or the processed vehicle information to a cloud server together with vehicle identification information through wireless communication.

In an embodiment, the processing unit is further configured to acquire vehicle information of another vehicle from the cloud server through wireless communication, and the acquired vehicle information of the other vehicle is used as vehicle information to be transmitted.

According to another aspect of the present disclosure, there is proposed a vehicle-mounted visible light reception system. The vehicle-mounted visible light reception system comprises: a visible light reception unit configured to receive, from another vehicle, a visible light signal carrying vehicle information of the other vehicle in a manner of switching between dimming and brightening over time, to obtain the carried vehicle information of the other vehicle; a processing unit configured to process the obtained vehicle information to obtain original vehicle information of the other vehicle; and a display unit configured to display the original vehicle information or display a corresponding predetermined image according to the original vehicle information.

In an embodiment, the vehicle information is image information collected by a vehicle-mounted camera or vehicle operation information collected from a vehicle electronic system, wherein when the vehicle information is the image information collected by the vehicle-mounted camera, the display unit is configured to display the image information, and when the vehicle information is the vehicle operation information collected from the vehicle electronic system, the display unit is configured to display a predetermined image corresponding to the vehicle operation information.

In an embodiment, the processing comprises at least one of: decoding, demodulation, decompression, and decryption.

In an embodiment, the visible light reception unit is configured to generate a binary code stream as the decoded vehicle information according to the received visible light signal, wherein "1" is generated in the code stream for a visible light signal indicating that light emission is enabled; and "0" is generated in the code stream for a visible light signal indicating that light emission is disabled.

In an embodiment, the processing unit is further configured to transmit instructions to a cloud server which comprise identification information of a target vehicle through wireless communication, so that the received visible light signal carries vehicle information from the target vehicle.

In an embodiment, the display unit may be a Head-Up Display (HUD) which covers all or at least a part of a front glass of a vehicle.

According to another aspect of the present disclosure, there is proposed a communication network comprising multiple visible light emission systems and multiple visible light reception systems respectively deployed on multiple vehicles, wherein a visible light emission system and a visible light reception system are deployed on each vehicle, wherein each visible light emission system comprises: a vehicle information acquisition unit configured to acquire vehicle information to be transmitted; an emission processing unit configured to process the vehicle information; and a visible light emission unit configured to transmit a visible light signal in a manner of switching between dimming and brightening over time based on the processed vehicle information, and each visible light reception system comprises: a visible light reception unit configured to receive, from another vehicle among the multiple vehicles which is different from a vehicle in which the visible light emission system is located, a visible light signal carrying vehicle information of the other vehicle in a manner of switching between dimming and brightening over time, to obtain the carried vehicle information of the other vehicle; a reception processing unit configured to process the vehicle information of the other vehicle; and a display unit configured to display the processed vehicle information of the other vehicle or display a corresponding predetermined image according to the processed vehicle information of the other vehicle.

In an embodiment, in the vehicle-mounted visible light emission system, processing the vehicle information comprises at least one of modulation, compression, encryption and encoding.

In an embodiment, in the vehicle-mounted visible light reception system, processing the obtained vehicle information comprises at least one of decoding, demodulation, decompression and decryption.

BRIEF DESCRIPTION OF THE DRAWINGS

In order to more clearly illustrate the technical solutions in the embodiments of the present disclosure or in the prior art, the accompanying drawings, which are intended to be used in the description of the embodiments, will be briefly described below. It will be apparent that the accompanying drawings in the following description are merely some embodiments of the present disclosure, and other accompanying drawings can be obtained by those of ordinary skill in the art according to these accompanying drawings without contributing any creative labor, wherein in the accompanying drawings.

DETAILED DESCRIPTION

Specific embodiments of the present disclosure will be described in detail below. It should be noted that the embodiments described here are illustrated merely by way of example instead of limiting the present disclosure. In the following description, numerous specific details are set forth to provide a more thorough understanding of the present disclosure. However, it will be obvious to those skilled in the art that the present disclosure may be practiced without these specific details. In other instances, well-known circuits, materials or methods are not described in detail in order to avoid obscuring the present disclosure.

Reference throughout this specification to "one embodiment", "an embodiment", "one example" or "an example" means that a particular feature, structure, or characteristic described in connection with the embodiment or example is included in at least one embodiment of the present invention. Thus, the appearances of the phrase "in one embodiment", "in an embodiment", "one example" or "an example" in various places throughout this specification are not necessarily all referring to the same embodiment or example. Furthermore, the particular features, structures, or characteristics may be combined in any suitable combination and/or sub-combination in one or more embodiments or examples. In addition, those skilled in the art should understand that the accompanying drawings provided herein are for the purpose of illustration, and are not necessarily drawn to scale. A term "and/or" used herein comprises any or all combinations of one or more listed related items.

The present disclosure will be described in detail below with reference to the accompanying drawings.

Figure 1:
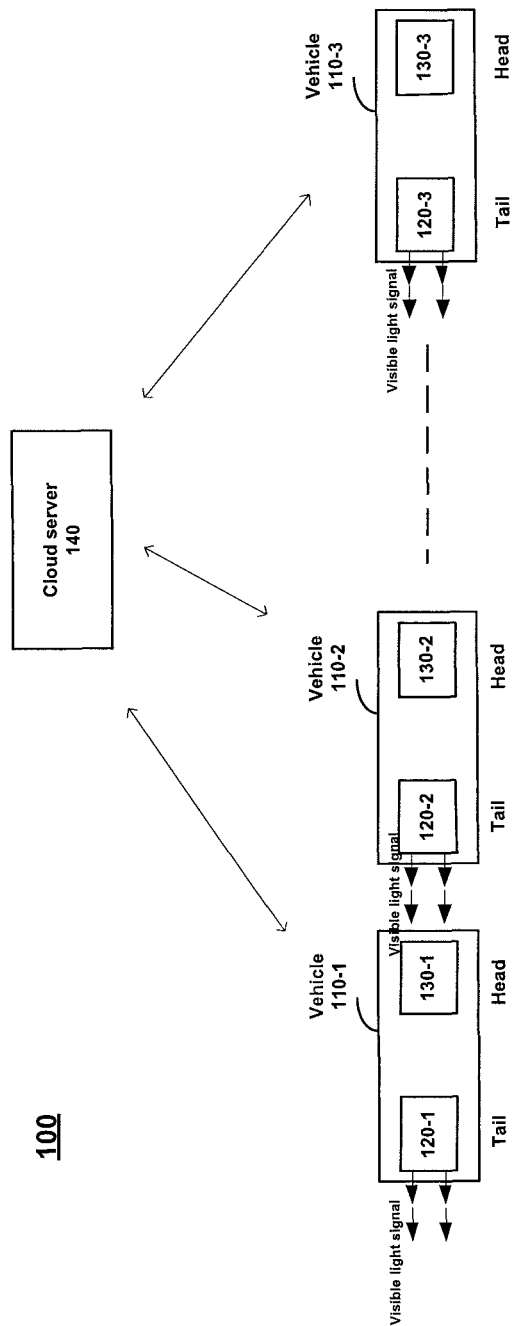
FIG. 1 illustrates an architecture diagram of an exemplary communication network for vehicle-mounted visible light communication according to an embodiment of the present disclosure.

FIG. 1 illustrates an architecture diagram of an exemplary communication network 100 according to an embodiment of the present disclosure.

As shown in FIG. 1, the communication network 100 comprises multiple vehicle nodes, i.e., vehicles 110-1, 110-2, and 110-3 (hereinafter collectively referred to as vehicle 110). It is to be noted that the three vehicle nodes shown in FIG. 1 are merely exemplary and in other embodiments of the present application, any number (greater than 1) of vehicle nodes may be included. Each vehicle node comprises a vehicle-mounted visible light emission system for emitting a visible light signal and a vehicle-mounted visible light reception system for receiving a visible light signal. Specifically, the vehicles 110-1, 110-2 and 110-3 have vehicle-mounted visible light emission systems 120-1, 120-2 and 120-3 (hereinafter collectively referred to as vehicle-mounted visible light emission system 120) respectively, and the vehicles 110-1, 110-2 and 110-3 further have vehicle-mounted visible light reception systems 130-1, 130-2 and 130-3 (hereinafter collectively referred to as vehicle-mounted visible light reception system 130) respectively. The communication network 100 may further comprise a cloud server 140 capable of wireless communication with the vehicle 110. It should be understood that although the communication network 100 is shown in FIG. 1 as comprising the cloud server 140, this is only an exemplary specific implementation of the technical solutions according to the present disclosure. In some embodiments of the present disclosure, the cloud server 140 may be removed or may be replaced with a node which implements a similar function by other means.

In FIG. 1, the vehicle 110-1 and the vehicle 110-2 are adjacent to each other, and the vehicle 110-3 is located at a geographical position far from the vehicle 110-1 and the vehicle 110-2. For ease of description, the vehicles 110-1, 110-2 and 110-3 are located on the same straight line (for example, on the same lane) in the figure, and have the same orientation of heads thereof, and the vehicles 110-1 and 110-2 may correspond to front and rear vehicles in two vehicles which are adjacent to each other in a general road driving situation. It is to be understood that this positional relationship is merely exemplary and does not limit the disclosure. The vehicles 110-1, 110-2 and 110-3 may also be arranged to have other positional relationships as long as the technical solutions described in this disclosure can be implemented.

In addition, in view of the limitation on a distance between an emission end and a reception end by the visible light communication, a distance between the vehicle 110-1 and the vehicle 110-2 in FIG. 1 (the visible light reception system of the vehicle 110-1 and the visible light emission system of the vehicle 110-2) which may be in visible light communication should be within a visible light communication distance.

In an embodiment, the vehicle-mounted visible light emission system 120 and the vehicle-mounted visible light reception system 130 may be implemented as a part of a vehicle electronic system of the vehicle 110. At this time, modules and units comprised in the vehicle-mounted visible light emission system 120 and the vehicle-mounted visible light reception system 130 for implementing specific functions may be common units in the vehicle electronic system. For example, as described below, the vehicle-mounted visible light reception system 130 comprises a display unit which may be a vehicle-mounted display screen existing in a general vehicle electronic system for displaying all or a part of information of the vehicle electronic system.

In another embodiment, the vehicle-mounted visible light emission system 120 and the vehicle-mounted visible light reception system 130 may also be implemented as separate additional devices, which are connected to the vehicle electronic system through particular interfaces. In this embodiment, the vehicle-mounted visible light emission system 120 as a separate additional device may be arranged at a tail of the vehicle 110. In other embodiments, the vehicle-mounted visible light emission system 120 may also be arranged at other suitable locations of the vehicle, for example, at a door of the vehicle or on the top or the bottom of the vehicle. Likewise, the vehicle-mounted visible light reception system 130 as a separate additional device may be arranged at a head of the vehicle 110 to receive a visible light signal emitted from a corresponding vehicle-mounted visible light emission system located at a tail of a front vehicle. In other embodiments, the vehicle-mounted visible light reception system 130 may also be arranged at other suitable locations of the vehicle, for example, at a door of the vehicle or on the top or the bottom of the vehicle. However, it should be noted that an arrangement of the vehicle-mounted visible light reception system 130 should be adapted to that of the vehicle-mounted visible light emission system 120, so as to enable stable reception of the visible light signal.

In yet another embodiment, a part of the vehicle-mounted visible light emission system 120 (and/or the vehicle-mounted visible light reception system 130) may be implemented as the separate additional device as described above, and other parts of the vehicle-mounted visible light emission system 120 (and/or the vehicle-mounted visible light reception system 130) may be implemented by components in the vehicle electronic system.

The cloud server 140 may receive messages and data from the vehicle 110 and transmit messages and data to the vehicle 110 in a wireless communication manner. The cloud server 140 is also capable of storing the data received from the vehicle 110 to transmit requested data to a corresponding vehicle upon receipt of a call request.

The vehicle-mounted visible light emission system 120 and the vehicle-mounted visible light reception system 130 in the communication network 100 shown in FIG. 1 will be described below with reference to FIG. 2 and FIG. 3, respectively. Then, referring back to FIG. 1, the architecture of the communication network 100 is further described on the basis of the vehicle-mounted visible light emission system 120 and the vehicle-mounted visible light reception system 130 illustrated in FIG. 2 and FIG. 3.

Figure 2:
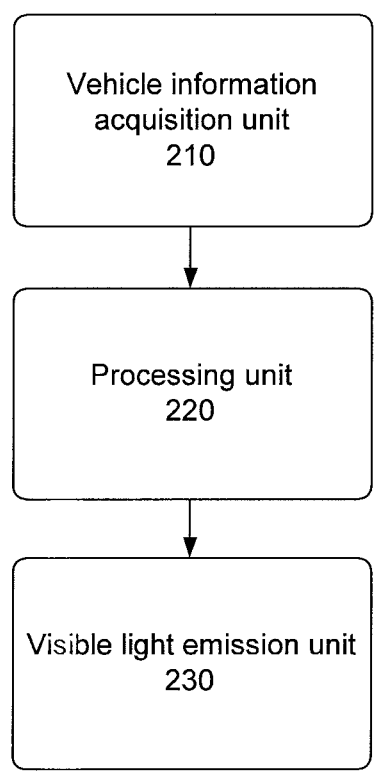
FIG. 2 illustrates an exemplary structural block diagram of a vehicle-mounted visible light emission system in the communication network shown in FIG. 1.

FIG. 2 illustrates an exemplary structural block diagram of the vehicle-mounted visible light emission system 120 (for example, the vehicle-mounted visible light emission system 120-2 in the vehicle 110-2) in the communication network 100 shown in FIG. 1.

As shown in FIG. 2, the vehicle-mounted visible light emission system 120 comprises a vehicle information acquisition unit 210, a processing unit 220, and a visible light emission unit 230. The vehicle information acquisition unit 210 is configured to acquire vehicle information to be transmitted. The processing unit 220 is configured to process the vehicle information acquired by the vehicle information acquisition unit 210. The visible light emission unit 230 is configured to transmit the visible light signal in a manner of switching between dimming and brightening over time based on the processed vehicle information. For example, the vehicle 110-2 shown in FIG. 1 may transmit a visible light signal to the vehicle 110-1 through such a vehicle-mounted visible light emission system 120-2 to enable the vehicle 110-1 to call vehicle information of the vehicle 110-2.

In an embodiment, the vehicle information acquisition unit 210 may be a vehicle-mounted camera, and the vehicle information acquired by the vehicle information acquisition unit 210 is image information collected by the camera. Specifically, the vehicle-mounted camera may be a dedicated camera or a camera carried on another additional device, such as an automobile data recorder. Of course, the vehicle-mounted camera may also be a camera or another device capable of collecting image information integrated in a vehicle system.

In another embodiment, the acquired vehicle information may be vehicle operation information collected from the vehicle electronic system, such as emergency braking information, deceleration information, corner turning information etc.

In an embodiment, the vehicle-mounted visible light emission system 120 may determine a category of the vehicle information to be transmitted according to an indication (which is received via the cloud server 140 for example) from a receiving vehicle.

The information acquired by the vehicle information acquisition unit 210 may not be directly transmitted or a large amount of information acquired by the vehicle information acquisition unit 210 needs to be transmitted. In order to enable timely and accurate information transmission, the acquired vehicle information needs to be processed by the processing unit 220. In an embodiment, processing performed by the processing unit 220 comprises at least one of modulation, compression, encryption and encoding.

In an embodiment, the processing unit 220 may be implemented by a processor or controller of the vehicle-mounted electronic system. In other embodiments, the processing unit 220 may be implemented by a separate central processing unit.

In an embodiment, the processed vehicle information is in a form of binary code stream.

In an embodiment, the visible light emission unit 230 is implemented as a dedicated LED module or a vehicle light (for example, a taillight). The LED module may be in at least two operation states, i.e., a "light emission-enabled" state and a "light emission-disabled" state. In an embodiment of the present disclosure, the "light emission-enabled" state corresponds to a state in which there is specific light intensity, and the "light emission-disabled" state corresponds to a state in which light intensity is 0. In another embodiment of the present disclosure, the "light emission-enabled" state corresponds to a state in which there is first light intensity, and the "light emission-disabled" state corresponds to a state in which there is second light intensity less than the first light intensity. It will be understood by those skilled in the art that the "light emission-enabled" and "light emission-disabled" states are merely representations of states of the LED module which can be distinguished by a reception unit (for example, an optoelectronic reception module described below), and do not impose any restriction on specific light intensity of the represented states.

In the above-described embodiment, the LED module continuously switches between the two operation states, so that it can transmit a visible light signal to a rear vehicle in a manner of switching between dimming and brightening (corresponding to switching between the "light emission-enabled" state and the "light emission-disabled" state). It should be noted that the switching between dimming and brightening does not affect normal use of a taillight of the vehicle.

In a case that the processed vehicle information is in a form of binary code stream, the visible light emission unit 230 is further configured to enter the "light emission-enabled" state for "1" (or "0") in the code stream and enter the "light emission-disabled" state for "0" (or "1") in the code stream.

A unit operation time of the visible light emission unit 230 corresponding to each bit ("0" or "1") in the code stream may be set according to a desired visible light communication rate, i.e., duration in which the visible light emission unit 230 is in the "light emission-enabled" state or the "light emission-disabled" state may be set for each bit. For example, when the duration is 1 millisecond (1 ms), the corresponding visible light communication rate is 1 kilobits per second (1 kbit/s).

In an embodiment, the processing unit 220 is further configured to transmit the vehicle information acquired by the vehicle information acquisition unit 210 or the vehicle information which is further processed by the processing unit 220 to the cloud server 140 (as shown in FIG. 1) through wireless communication. Preferably, the processing unit 220 is configured to transmit the vehicle information to the cloud server 140 together with vehicle identification information for storage by the cloud server 140. Specifically, when the vehicle information is image information collected by the vehicle-mounted camera, the processing unit 220 is configured to transmit the image information to the cloud server 140 together with the vehicle identification information. The cloud server 140 may receive image information from various moving vehicles (for example, the vehicles 110-1, 110-2 and 110-3, etc.) respectively, and store the image information using the vehicle identification information as identification of the received image information. In an embodiment, the vehicle identification information may comprise license plate number information, vehicle location information, vehicle communication network identity information etc.

In an embodiment, the processing unit 220 is configured to acquire vehicle information of another vehicle (for example, the vehicle 110-3 in FIG. 1) from the cloud server 140 through wireless communication and use the acquired vehicle information of the other vehicle as the vehicle information to be transmitted as described above. Specifically, according to the above description, the processing unit of the visible light emission system 120-3 in the vehicle 110-3 may upload image information collected by a vehicle-mounted camera thereof to the cloud server 140. Then, the cloud server 140 transmits the image information of the vehicle 110-3 to the vehicle 110-2 based on an indication (for example, an instruction from the vehicle 110-1 comprising identification information and/or location information). In this case, the vehicle information transmitted by the vehicle 110-2 when the vehicle 110-2 is in visible light communication with the vehicle 110-1 is no longer the vehicle information of the vehicle 110-2 itself, but the image information of the vehicle 110-3 received from the cloud server 140. Thus, it enables the vehicle 110-1 to call the image information of the vehicle 110-3.

Figure 3:
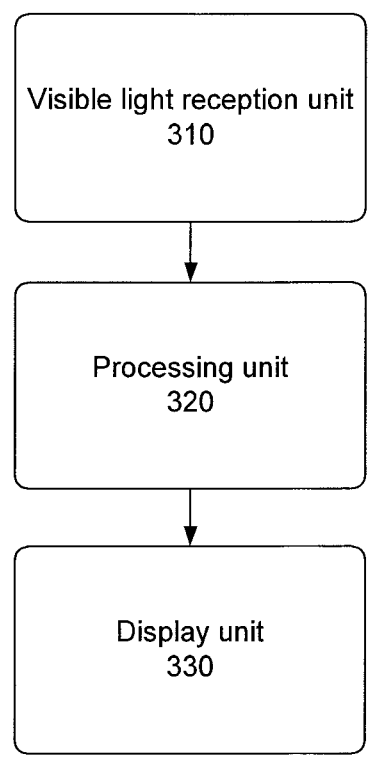
FIG. 3 illustrates an exemplary structural block diagram of a vehicle-mounted visible light reception system in the communication network shown in FIG. 1.

FIG. 3 illustrates an exemplary structural block diagram of the vehicle-mounted visible light reception system 130 (for example, the vehicle-mounted visible light reception system 120-1 in the vehicle 110-1) in the communication network 100 shown in FIG. 1.

As shown in FIG. 3, the vehicle-mounted visible light reception system 130 comprises a visible light reception unit 310, a processing unit 320 and a display unit 330. The visible light reception unit 310 is configured to receive, from another vehicle (for example, the vehicle 110-2), a visible light signal carrying vehicle information of the other vehicle in a manner of switching between dimming and brightening over time, to obtain the carried vehicle information of the other vehicle. The processing unit 320 is configured to process the obtained vehicle information to obtain original vehicle information of the other vehicle. The display unit 330 is configured to display the original vehicle information or display a corresponding predetermined image according to the original vehicle information. For example, the vehicle 110-1 shown in FIG. 1 may receive a visible light signal from the vehicle 110-2 through such a vehicle-mounted visible light reception system 130-1 to enable the vehicle 110-1 to call the vehicle information of the vehicle 110-2.

The visible light reception unit 310 may be implemented as a photoelectric reception module. According to the description in FIG. 2, the received vehicle information is image information collected by a vehicle-mounted camera (for example, the vehicle-mounted camera of the vehicle 110-2) or vehicle operation information collected from the vehicle electronic system.

In an embodiment, the visible light reception unit 310 generates a binary code stream according to the received visible light signal, which is consistent with the case of transmitting the vehicle information in a form of binary code stream as described in FIG. 2. Specifically, the visible light reception unit 310 generates "1" in the code stream for a "light emission-enabled" time unit (i.e., the visible light reception unit 310 senses light intensity exceeding a predetermined threshold in the time unit) in the visible light signal, and generates "0" in the code stream for a "light emission-disabled" time unit (i.e., the visible light reception unit 310 does not sense light intensity exceeding the predetermined threshold in the time unit) in the visible light signal. In an embodiment, the predetermined threshold corresponds to a value slightly less than the light intensity of the visible light emission unit 210 in the "light emission-enabled" state as described above.

As described above, before the visible light signal is transmitted, it is possible to process the transmitted vehicle information in order to be able to realize timely and accurate information transmission. For this reason, processing should also be performed in the visible light reception system 130 to restore the desired "original" vehicle information. In an embodiment, the processing performed by the processing unit 320 comprises at least one of decoding, demodulation, decompression and decryption.

In an embodiment, the processing unit 320 may be implemented by a processor or controller of the vehicle-mounted electronic system. In other embodiments, the processing unit 320 may be implemented by a separate central processing unit. In the same vehicle, the processing unit 220 and the processing unit 320 may be the same processing unit.

The display unit 330 may be a display screen or a dedicated additional display unit of the vehicle 110.

When the received vehicle information is image information collected by the vehicle-mounted camera, the display unit 330 is configured to display the received image information. When the received vehicle information is vehicle operation information collected from the vehicle electronic system, the display unit 330 is configured to display a predetermined image corresponding to the vehicle operation information. For example, when the received vehicle information is vehicle operation information about emergency braking, a predetermined image comprising an exclamation mark "!" may be displayed on the display unit 330 to alert a driver of a rear vehicle to safety.

In an embodiment, the display unit 330 may display the received image information or the predetermined image only through a part of an area of the display screen thereof.

In another embodiment, the display unit 330 may be a Head-Up Display (HUD) which covers all or at least a part of a front glass of the vehicle. Specifically, in order to make a viewed visual field of a front vehicle more realistic, the HUD may be used as the display unit 330 to enhance the sense of reality. In addition, if a person in the vehicle 110-1 wants to view a visual field of the vehicle 110-2 through the HUD but does not want to view the vehicle 110-2 in the viewed visual field, a vehicle body image of the vehicle 110-2 may be removed from a visual field of the vehicle 110-1, an image of a visual field blocked by the vehicle 110-2 is simulated by an appropriate algorithm using the received image information of the vehicle 110-2, and then the two images are spliced together to be completely projected onto a front windshield of the vehicle 110-1 in a suspended manner. As a virtual image is projected in a suspended manner and does not occupy the entire front windshield, it does not affect the safety of the driver.

In an embodiment, the processing unit 320 is further configured to transmit instructions which comprise identification information and/or location information of a target vehicle (for example, the vehicle 110-3) to the cloud server 140 through wireless communication, so that the received visible light signal carries vehicle information from the target vehicle.

In an embodiment, the process of transmitting the instructions is achieved by a driver of a receiving vehicle (for example, the vehicle 110-1) touching an icon representing a corresponding vehicle on a display screen on which multiple vehicles within a certain range are displayed.

Then, referring back to FIG. 1, the architecture of the communication network 100 is further described on the basis that the vehicle-mounted visible light emission system 120 and the vehicle-mounted visible light reception system 130 are described in detail above with reference to FIG. 2 and FIG. 3.

As shown in FIG. 1, the communication network 100 comprises multiple vehicle-mounted visible light emission systems 120 and multiple vehicle-mounted visible light reception systems 130 which are deployed respectively on multiple vehicle nodes 110, wherein a visible light emission system 120 and a vehicle-mounted visible light reception system 130 are deployed on each vehicle 110.

According to the description in FIG. 2, each vehicle-mounted visible light emission system 120 comprises a vehicle information acquisition unit 210, an emission processing unit 220, and a visible light emission unit 230. The vehicle information acquisition unit 210 acquires vehicle information to be transmitted. The emission processing unit 220 processes the vehicle information. The visible light emission unit 230 transmits the visible light signal in a manner of switching between dimming and brightening over time based on the processed vehicle information.

According to the description in FIG. 3, each vehicle-mounted visible light reception system 130 comprises a visible light reception unit 310, a reception processing unit 320 and a display unit 330. The visible light reception unit 310 is configured to receive, from another vehicle among the multiple vehicles 110 which is different from a vehicle in which the visible light emission system 120 is located, a visible light signal carrying vehicle information of the other vehicle in a manner of switching between dimming and brightening over time, to obtain the carried vehicle information of the other vehicle. The reception processing unit 320 is configured to process the vehicle information of the other vehicle. The display unit 330 is configured to display the processed vehicle information of the other vehicle or display a corresponding predetermined image according to the processed vehicle information of the other vehicle.

In the communication network 100 shown in FIG. 1, a visible light emission system 120 on each vehicle node 110 (for example, the vehicle 110-1) may be in visible light communication with a visible light reception system 130 on any other vehicle node 110 (for example, the vehicle 110-2) (in a case of an appropriate relative position relationship), and a visible light reception system 130 on each vehicle node 110 (for example, the vehicle 110-1) may receive a visible light signal from a visible light emission system 120 on any other vehicle node 110 (for example, the vehicle 110-2). The communication network 100 implemented by the structures and functions of the visible light emission system 120 and the visible light reception system 130 as described above enables stable information transmission between vehicle nodes.

In the communication network 100 of FIG. 1, the cloud server 140 is further shown. The cloud server 140 is capable of wireless communication with the vehicle 110. However, as described above, it should be understood that this is only an exemplary specific implementation of the technical solutions according to the present disclosure. In some embodiments of the present disclosure, the cloud server 140 may be removed or may be replaced with a node which implements a similar function by other means.

The technical solutions of the vehicle-mounted visible light communication according to the present disclosure are described above with reference to FIG. 1 to FIG. 3. It is to be noted that the vehicle-mounted visible light emission system 120 may always transmit the "vehicle information to be transmitted" or may also perform transmission only after receiving a transmission request (for example, through the cloud server 140). Similarly, the vehicle-mounted visible light reception system 130 may always receive the "vehicle information" (if present), or may also start the receiving process according to the needs of the driver. In addition, when the vehicle-mounted visible light reception system 130 receives more than one visible light signal, it may select one visible light signal therefrom according to intensity of the visible light signals.

According to some embodiments, if the vehicle 110-2 encounters a collision etc., a speed sensor or pressure sensor of the vehicle may sense a signal of a speed or pressure etc., and the signal is acquired by the vehicle information acquisition unit 210 and is transmitted by a wireless communication module (not shown) to the cloud server 140. This type of accident signal has a specific code, and when this type of accident signal is received by the cloud server 140, the cloud server 140 transmits this type of signal directly to a processing unit of each nearby vehicle (for example, vehicles 110-1 and 110-3) and display accident alert information on the display unit 330.

According to some embodiments, an aero-projection module is arranged on the top of the vehicle, and when the vehicle is in an emergency situation, it is possible to directly ionize the air through precise positioning of laser light in the air to transmit an emergency calling signal or warning signal, and when a vehicle-mounted camera of a vehicle captures this signal, a prompt may be issued on a display unit 330 of the vehicle, and at the same time a place where the accident vehicle is located is marked in a small map of the display unit 330. A driver of the vehicle is asked whether to switch displayed image information to image information of a vehicle closest to the accident vehicle.

According to some embodiments, when a passenger sits on a back seat of the vehicle 110, the passenger often cannot view a landscape ahead due to obstruction by seats of the vehicle. In this case, an image recorded by a vehicle-mounted camera may be transmitted to a display unit 330 in front of the back seat of the vehicle, so that both a driver and the passenger can enjoy more landscape. Especially when family members travel together, there is often a case that a person who sits on a front seat views a certain landscape through a windshield window and may describe the landscape to a person who sits on a back seat. In this case, the person who sits on the back seat can view the landscape only through a gap between front seats. However, due to a time difference, the person who sits on the back seat may miss viewing this landscape. By transmitting the image from the camera to the display in front of the back seat, each member who sits in the vehicle can enjoy landscapes all around the vehicle. In addition, discomfort of passengers who have car sickness can be reduced through the image from the front camera. Similarly, if a camera is installed on a side window of the vehicle, image information of the side may also be transmitted to a display unit 330 in front of the front seat of the vehicle. The information is transmitted in the same manner as in the above embodiment.

The foregoing detailed description has set forth various embodiments of the inspection method and system via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, Modifications and alternatives falling within the scope of the claims and equivalents thereof are to be encompassed by the scope of the present disclosure which is defined by the claims as attached.

We claim:

1. A visible light emission system in a first vehicle, comprising:
   a vehicle information acquisition unit configured to acquire vehicle information to be transmitted;
   a processor configured to process the vehicle information; and
   a visible light emitter configured to transmit a visible light signal in a manner of switching between dimming and brightening over time based on the processed vehicle information;
   wherein the vehicle information acquisition unit comprises a camera and the vehicle information comprises image information acquired by the camera;
   wherein an aero-projection module is provided on top of the first vehicle, the aero-projection module is configured to, in response to the first vehicle being in an emergency situation, transmit to an emergency calling signal or a warning signal by ionizing air with a laser light so that a camera in a second vehicle captures the emergency calling signal or the warning signal.

2. The system according to claim 1, wherein the vehicle information further comprises vehicle operation information collected from a vehicle electronic system of the first vehicle.

3. The system according to claim 1, wherein processing the vehicle information comprises at least one of: modulation, compression, encryption, and encoding.

4. The system according to claim 1, wherein the processed vehicle information is in a form of binary code stream, and the visible light emitter is configured to:
   enter a "light emission-enabled" state for "1" in the code stream; and
   enter a "light emission-disabled" state for "0" in the code stream.

5. The system according to claim 1, wherein the processor is further configured to transmit the vehicle information or the processed vehicle information to a cloud server together with vehicle identification information through wireless communication.

6. A visible light reception system in a first vehicle, comprising:
   a visible light receiver configured to receive, from a second vehicle, a visible light signal carrying vehicle information of the second vehicle in a manner of switching between dimming and brightening over time, to obtain the carried vehicle information of the other vehicle;

a processor configured to process the obtained vehicle information to obtain original vehicle information of the second vehicle; and a display configured to display the original vehicle information or display a corresponding predetermined image according to the original vehicle information; and a camera configured to capture an emergency calling signal or a warning signal transmitted from an aero-projection module provided on top of a second vehicle by ionizing air with a laser light in response to the second vehicle being in an emergency situation.

7. The system according to claim 6, wherein the vehicle information further comprises vehicle operation information collected from a vehicle electronic system, wherein the display is further configured to display a predetermined image corresponding to the vehicle operation information.

8. The system according to claim 6, wherein the processing comprises at least one of: decoding, demodulation, decompression, and decryption.

9. The system according to claim 6, wherein the visible light receiver is configured to generate a binary code stream as the decoded vehicle information according to the received visible light signal, wherein "1" is generated in the code stream for a visible light signal indicating that light emission is enabled; and "0" is generated in the code stream for a visible light signal indicating that light emission is disabled.

10. The system according to claim 6, wherein the processor is further configured to transmit instructions to a cloud server which comprise identification information and/or location information of a target vehicle through wireless communication, so that the received visible light signal carries vehicle information from the target vehicle.

11. The system according to claim 6, wherein the display is a head-up display which covers all or at least a part of a front glass of a vehicle.

12. A communication network comprising multiple visible light emission systems and multiple visible light reception systems respectively deployed on multiple vehicles, wherein a visible light emission system and a visible light reception system are deployed on each vehicle, wherein each visible light emission system comprises:
a vehicle information acquisition configured to acquire vehicle information to be transmitted;
a processor configured to process the vehicle information; and
a visible light emitter configured to transmit a visible light signal in a manner of switching between dimming and brightening over time based on the processed vehicle information, and
wherein the vehicle information acquisition unit comprises a camera and the vehicle information comprises image information acquired by the camera;
wherein an aero-projection module is provided on top of the vehicle, the aero-projection module is configured to, in response to the vehicle being in an emergency situation, transmit to an emergency calling signal or a warning signal by ionizing air with a laser light so that a camera in the another vehicle captures the emergency calling signal or the warning signal;

each visible light reception system comprises:
a visible light receiver configured to receive, from the another vehicle, a visible light signal carrying vehicle information of the another vehicle in a manner of switching between dimming and brightening over time, to obtain the carried vehicle information of the another vehicle;
a processor configured to process the vehicle information of the another vehicle; and
a display configured to display the processed vehicle information of the another vehicle or display a corresponding predetermined image according to the processed vehicle information of the another vehicle.

13. The communication network according to claim 12, wherein, in the vehicle-mounted visible light emission system, processing the vehicle information comprises at least one of modulation, compression, encryption and encoding.

14. The communication network according to claim 12, wherein, in the vehicle-mounted visible light reception system, processing the obtained vehicle information comprises at least one of decoding, demodulation, decompression and decryption.

* * * * *